United States Patent [19]

Mehlich

[11] 3,993,979

[45] Nov. 23, 1976

[54] TIME DIVISION-MULTI-VOLTAGE LEVEL MATRIX SWITCHING

[76] Inventor: Karl R. Mehlich, 2724 Everett Ave., Raleigh, N.C. 27607

[22] Filed: July 21, 1975

[21] Appl. No.: 597,324

[52] U.S. Cl. .......................... 340/166 R; 179/15 A; 340/324 M; 340/337

[51] Int. Cl.[2] .......................................... H04Q 11/00

[58] Field of Search ........ 179/15 BY, 15 AQ, 15 A, 179/15 BA, 15 AT; 340/166 R, 324 M, 337

[56] References Cited

UNITED STATES PATENTS 3,859,467 1/1975 Borgstrom ...................... 179/15 BY

*Primary Examiner*—Harold I. Pitts

*Attorney, Agent, or Firm*—Mills & Coats

[57] ABSTRACT

The present invention relates to a time division, multi-voltage level matrix switching system wherein a minimum number of connecting lines or wires are used between a transmitter and a receiver for actuating a multiplicity of working units such as lights, communication devices, and other types of signalling devices. More particularly, each respective working unit is operatively connected in a matrix configuration, with a plurality of such working units being operatively connected in various normally open circuits within the matrix complex. The matrix complex is controlled by a central switching system that is operatively connected thereto and is adapted to provide at least two different voltage level signals to anyone of the normally open circuits within the matrix complex in order that the circuit will be closed, and a particular working unit therein will be actuated. Of important significance, is that the central switching station is adapted and designed such that two timed voltage level signals can be placed on a single main conductor line in the same time sequence, and wherein the two voltage signals are operative to effectively simultaneously close one circuit having at least one working unit operatively connected therein.

5 Claims, 5 Drawing Figures

TIME DIVISION-MULTI-VOLTAGE LEVEL MATRIX SWITCHING

BACKGROUND OF THE INVENTION

The present invention relates to communication equipment, and more particularly to a communication system involving a receiver area wherein there is situated a plurality of working units electrically connected in a matrix configuration, and wherein the communication system utilizes timed electric pulses of various voltage levels to actuate any selected working unit within the receiver area matrix.

As a general rule, it is appreciated that to actuate an electrical communication or signaling device that is remotely situated, it normally requires two lines or wires from the position of actuation to the communication or signaling device itself in order that a circuit be completed. In cases involving a complex of communication or signaling devices, it has been common practice to run a pair of wires from the particular switching station to the remote area (sometimes referred to as a receiving area) in which case separate pairs of wires actually run from the main switching station to each of the communication or signaling devices at the receiving area. Obviously, in these types of cases, it requires a tremendous amount of communication wire and connecting lines to accomplish this, and such is rather expensive.

SUMMARY OF THE INVENTION

The present invention entails a communication system for actuating from a transmitting station or area anyone of a plurality of working units remotedly situated in a receiving area. In particular, the working units are electrically connected in a matrix configuration to form what may be referred to as a receiver or receiving area. The working units within the receiving area are operatively connected together within respective normally open circuits, each normally open circuit including first and second current flow control means that are responsive to different voltage levels, and whereupon receiving a particular voltage level, the respective current flow control means within each normally open circuit is actuated and that part of the circuit is closed.

Extending from the main switching station or transmitter is a plurality of main conductor lines that are selectively connected to respective circuits comprising the matrix receiver. Operatively associated with the transmitter is a time division electric pulse generator that generates voltage pulses of a given voltage level and sends the same down respective main conductor lines between the transmitter and receiver in timed sequence.

Each working unit comprising the matrix receiver is operatively connected in a particular matrix row and a matrix column. Each of the matrix rows and the matrix columns include a current flow control means therein that is normally open and is responsive to voltage signals of a predetermined magnitude. The current flow control means in the matrix rows requires a different and distinct voltage signal for actuation then the current flow control means in the matrix columns. In the case of the preferred embodiment, the current flow control means in the matrix row is responsive to a plus voltage while the current flow control means in the matrix columns is responsive to a negative voltage. So, therefore, in using time division voltage pulses, any particular working unit can be actuated by the communication system of the present invention in those cases where both the current flow control means in the matrix row and in the matrix column is simultaneously actuated, thereby closing the circuit in which the particular working unit is disposed therein. In effect, as will be appreciated from studying the preferred embodiment, one particular main conductor line extending between the transmitter and the matrix receiver is capable of actuating both a matrix row and a matrix column by the use of a switching system that is effective to simultaneously place on any one line a opposite polarity voltage signals. Since the voltage signals are in the same time sequence and are of opposite polarity in accordance with the current flow control means in both the matrix rows and columns of the receiver, it follows that one wire is operative to transmit electric signals that will effectively close the normally open circuit extending around the desired working unit to be actuated.

It is, therefore, an object of the present invention to minimize the number of main connecting lines or wires that extend between the main switching station and a multiplicity of working units (such as lights, audible or visual signals, etc.) in a communication system.

A further object of the present invention is to provide a communication system wherein a complex of working units are electrically connected in a matrix pattern, and wherein by the selective use of time division electric pulses of different voltage levels, one main connecting line or wire from a main switching system to the matrix complex of working units can be utilized to actuate anyone of a series of working units therein.

A further object of the present invention is to provide a communication system of the type described above wherein certain working units of the matrix complex can be actuated by the use of time division electric pulses of opposite or reverse polarity.

Still a further object of the present invention is to provide a versatile, efficient, and relatively inexpensive communication system that may be utilized in a wide range of applications such as hospitals, motels, office complexes, etc.

DESCRIPTION OF THE PREFERRED EMBODIMENT

With further reference to the drawings, the time division-multi-voltage level communication system is shown therein and indicated generally by the numeral 100. The communication system of the present invention, as illustrated in the preferred embodiment, comprises three principal components: (1) a transmitter 112, (2) a series of main conductor lines 114 (referred to by 114*a* through 114*j*) a common ground line, and (3) a receiver 116. Generally, the transmitter 112 is adapted to generate voltage signals and to send the signal in a controlled sequence to the receiver 116 via the main connecting lines 114. As will be more fully appreciated and understood from the subsequent disclosure, the transmitter 112 is capable of actuating anyone of a plurality of so called working units that form a part of the receiver. More particularly, by actuating selective switches associated with the transmitter 112, the communication system of the present invention has the capability to actuate and energize anyone of the plurality of working units associated with the receiver 116.

Figure 1:
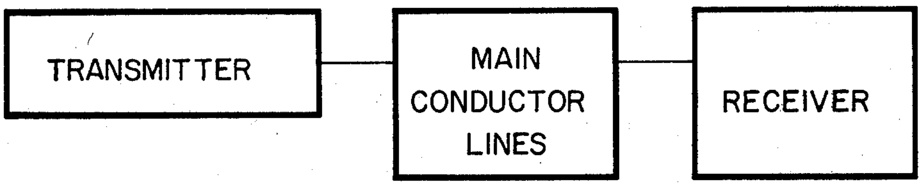
FIG. 1 is a block diagram illustrating the main components of the communication system of the present invention.
Figure 2:
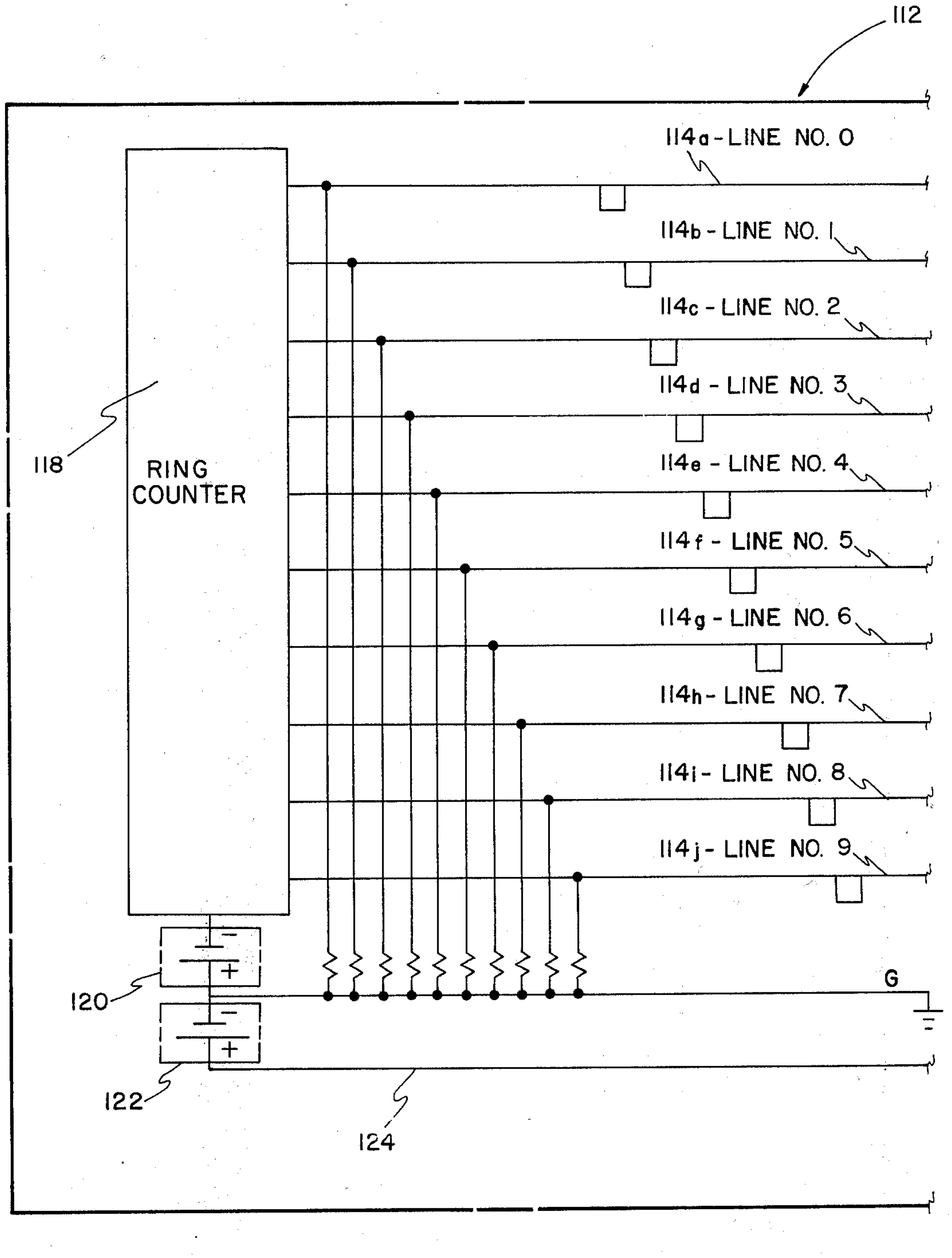
FIG. 2 is an electrical schematic illustration of a first portion of the transmitter, showing the ring counter portion thereof.
Figure 3:
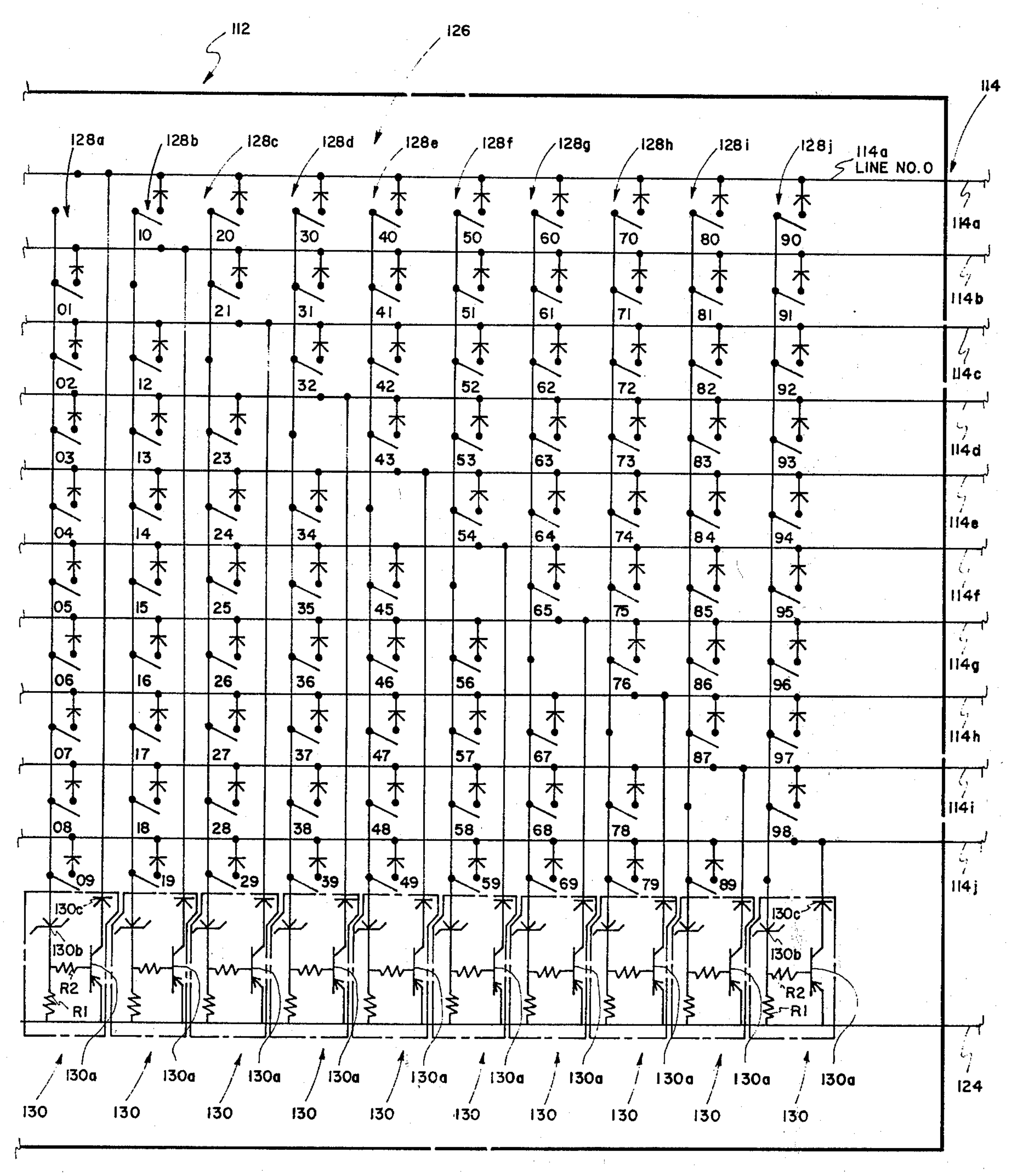
FIG. 3 is a schematic continuation of FIG. 2, and shows a second portion of the transmitter including a series of switching circuits.
Figure 4:
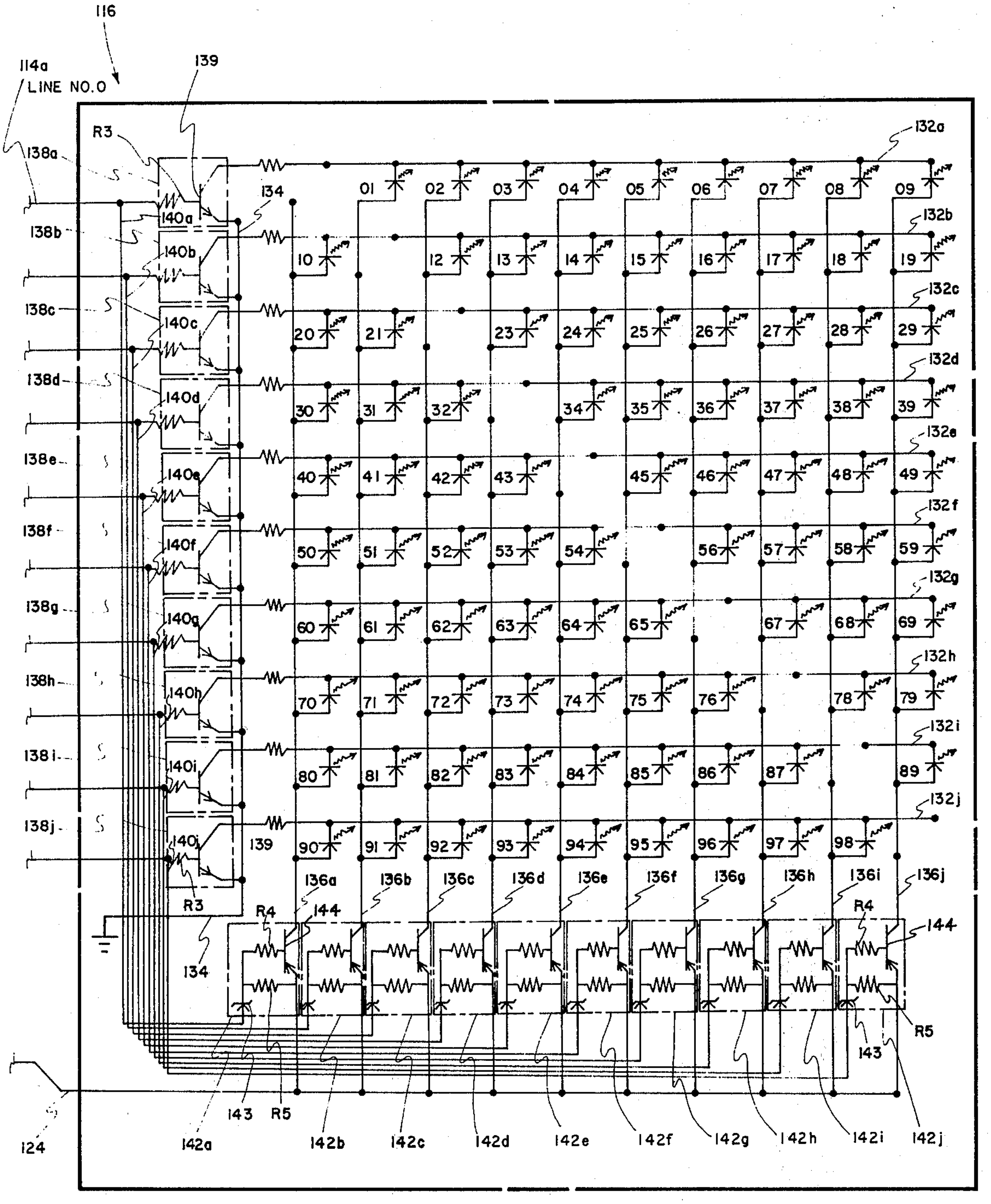
FIG. 4 is an electrical schematic showing the receiver of the present invention.

Reviewing the transmitter 112, it is seen that the same includes what is referred to as a ring counter 118, the ring counter 118 being operative to place a voltage pulse or signal on each of the main conductor lines 114 in a selected time sequence. In the preferred embodiment, as illustrated herein, the ring counter 118 is operative to apply a negative voltage pulse to each main conductor line 114 in timed sequence. Details of the ring counter 118 are not described in detail herein because such devices are well known in the art and is not material per se to the present invention. As illustrated in FIG. 2, however, a voltage source 120 is operatively connected from the ground line through the ring counter 118 to each of the main conductor lines 114. As an example, the voltage source illustrated is a minus 10 volts, but the voltage could be other suitable means. By selecting the ring counter of a particular cyclic frequency, it is seen that in operation the minus 10 volts is placed on the lines 114 in timed sequence. For example, as illustrated in the present invention, the ring counter 118 is connected to 10 main conductor lines 114, and the ring counter 118 could be so designed that a minus 10 volts could be applied to each consecutive main conductor line 114 every millisecond. Therefore, it is appreciated that if such a cyclic frequence were chosen, that each respective line of the main conductor lines 114 would recive a minus 10 volts every 10 milliseconds. At anyone time, there can be only one voltage pulse on the main conductor lines directly due to the ring counter 118. Each voltage pulse on the main conductor lines that is due to the ring counter 118 will be in a particular time slot, the time slots being referred to as time slots 0 through 9 for the purpose of explaining and illustrating the present invention as disclosed herein.

There is also provided a second voltage source 122 that also forms a part of the transmitter 112 and extends therefrom to the receiver 116 via a secondary voltage line 124.

In addition, the transmitter 112 is provided with a switching circuitry complex 126 that in effect is operative to place a different level voltage pulse on anyone of the respective main conductor lines 114 in a selected time slot. More particularly, the switching complex 126 comprises a series of line switching circuits indicated generally by 128*a*, 128*b*, 128*c*, 128*d*, 128*e*, 128*f*, 128*g*, 128*h*, 128*i*, and 128*j*. Each of the line switching circuits 128 includes a numbered switch therein that is operative to complete a circuit between respective main conductor lines 114 and a respective current control unit 130. In effect, it is seen that by closing a respective numbered switch in any of the line switching circuits 128, that such is effective to transfer the particular negative voltage pulse from the respective main conductor line 114 to the line switching circuits 128, and consequently to the respective current control unit 130 associated therewith. Also, it is seen that each of the line switching circuits 128 is electrically connected to the secondary voltage line 124 at various points therealong. The function of each of the current control units 130 is to actuate a bi-polar transistor 130*a* included therein such that the secondary voltage 122 can pass through the normally open bi-polar transistor 130*a* and can be placed on anyone of the respective main conductor lines 114 in which any particular line switching circuit 128 is connected to. Although it will be appreciated by those skilled in the art that various circuitry designs could be used to accomplish the same function, each current control unit 130, as illustrated in the preferred embodiment, includes a zener diode 130*b* and a current directional control diode 130*c*. In addition, each current control unit 130 includes a pair of resistors $R_1$ and $R_2$ operatively connected therein.

Thus, it is seen that in effect each line switching circuit 128*a* through 128*j* is operative to place the voltage of the voltage source 122 on a particular main conductor line 114 simultaneously with a particular negative voltage pulse that is generated by the ring counter 118 and on a respective main conductor line 114. Consequently, if switch 12 of the switching complex 126 were to be closed, the effect of such would be to place a plus voltage, corresponding with the voltage source 122, on main conductor line 114*b* in the number 2 time slot. Therefore, at that precise time, there would be a plus voltage on line 114*b* and a negative voltage on line 114*c*.

Turning now to a discussion of the receiver 116, it is seen that the same is in the form of a matrix configuration in that the same comprises a series of matrix line rows 132*a* through 132*j*, and a series of matrix line columns 136*a* through 136*j*. Electrically connected between each of the matrix line rows 132 and a respective main conductor line 114 is a first current flow control means 138, each of said first current flow control means being indicated consecutively by 138*a* through 138*j*. The function of each of the first current flow control means is to sense the voltage level or magnitude of the voltage on the respective main conductor lines 114 and in certain cases where the voltage is of a certain level or polarity to close the circuit between each respective matrix line row 132 and a main ground line 134.

In the case of the preferred embodiment, as illustrated in the present disclosure, the first current flow control means includes a resistor $R_3$ and a transistor 139. The effect of the circuitry within the first flow control means 138 is that a positive voltage pulse on any respective main conductor line 114 will have the effect of actuating the transistor 139 of the current flow control means so as to close the normally open circuit between respective matrix line rows 132 and the main ground 134. However, it will be appreciated by those skilled in the art that there is other electrical circuitry designs that could be used to close the particular circuit in response to a voltage of a particular level or magnitude.

Electrically connected to each of the main conductor lines 114 is a series of secondary lines 140*a* through 140*j*. Each respective secondary line 140 is operatively connected to a second current flow control means 142, each second current flow control means 142 being operatively connected between a respective secondary line 140 and a matrix line column 136. In addition, it is seen that each of the second current flow control means 142 is operatively connected to the secondary voltage line 124.

As in the case with the first current flow control means 138, each of the second current flow control means function to close the circuit between the secondary voltage line 124 and respective matrix line columns 136. More particularly, the secondary current flow control means 142 is responsive to certain voltage levels to close the circuit between the lines 136 and the secondary voltage line 124. With respect to the particular circuitry illustrated in the preferred embodiment for the second current flow control means 142, it is seen that the same includes a zener diode 143 and a transistor 144 with a pair of resistors $R_4$ and $R_5$ (of selected value) operatively connected therebetween. In the case of the preferred embodiment, the second current flow control means (142*a*–142*j*) is responsive only to a negative voltage pulse and when that negative voltage pulse is received, the secondary current flow control means 142 is operative to actuate the transistor 144 therein and consequently, close the electrical circuit between the secondary voltage line 124 and respective matrix line columns 136.

Operatively connected between respective matrix line rows 132 and matrix line columns 136 is a multiplicity of working units schematically shown that are numbered 01 to 98. It should be pointed out that the two voltage signals used to actuate the receiver 116 are not placed on the same line because in the embodiment illustrated the plus and minus voltages would cancel each other out and consequently, would be of no effect. Therefore, it is seen that there are no working units numbered 00, 11, 22, etc.

In operation, assume that it would be desirable to actuate working unit 45 of the receiver 116. To do so, switch 45 of the switching system 126 would be closed and as seen in the drawings, switch 45 lies in switching circuit 128*e*. In closing switch 45, the design of the present communication system in effect means that the unit portion of the switch number represents the number five time slot of the cyclic frequency of the ring counter 118, and the four or the decade portion of the number represents the particular main conductor line with the number four line corresponding to line 114*e*. (The number zero line refers to 114*a*, and the number nine line refers to line 114*j*, and so on in corresponding fashion.)

Continuing to refer to the communication system and the closing of switch 45, it is seen that the negative voltage pulses on the number five line (114*f*) is transmitted down to the associated current control unit 130, and for the time instance that the negative voltage pulse is on the number five line (114*f*), the transistor 130*a* associated therewith is closed and a plus voltage pulse from secondary line 124 is transmitted up to line 114*e* or the number four line. In the case where voltage source 120 is a minus 10 volts and voltage source 122 is a plus 10 volts, it then follows that at the very same time, the closing of swtich 45 causes a plus 10 voltage pulse to be sent down the number 4 line 114*e* at the same time and in unison therewith the negative voltage pulse of minus 10 volts is caused to move down the number five line or line 114*f*. So, therefore, the plus voltage pulse on line number 4 will actuate the first current flow control means 138*e* at the same time the negative voltage pulse on line 114*f* actuates the second current flow control means 142*f*. It follows from the previous discussion that the simultaneous actuation of these two current flow control means will result in a completed circuit around working unit 45 and consequently, working unit 45 would be actuated and a current will flow from the secondary voltage line 124 through the secondary current flow control means 142*f*, and on through line 136*f* and through the load working unit 45. From line 132*e* it is seen that because of the actuation of first current flow control means 138*c*, that current is allowed to flow therefrom to the main ground line 134 of the receiver. Consequently, it is seen that the secondary voltage source 122 provides the energy and current to actuate working unit 45.

This same basic principle of operation holds for the remaining working units of the receiver 116 as the closing of any switch in the switching complex 126 results in a corresponding working unit being actuated. As has been discussed, the switch number and the corresponding working unit number is respresentative of a particular time slot of the ring counter 118 and a respective main conductor lines 114. Each switch and corresponding working unit is designated by a two digit number, the units being indicative of the particular time slot chosen and the decade portion being representative of the line number (lines 0 to 9 being referred to by 114*a* through 114*j*). Obviously, the line number and the time slot reference could be reversed and the particular working units would thusly be accordingly designated. Also, the number of working units, main lines, and switches could be increased or decreased.

Figure 5:
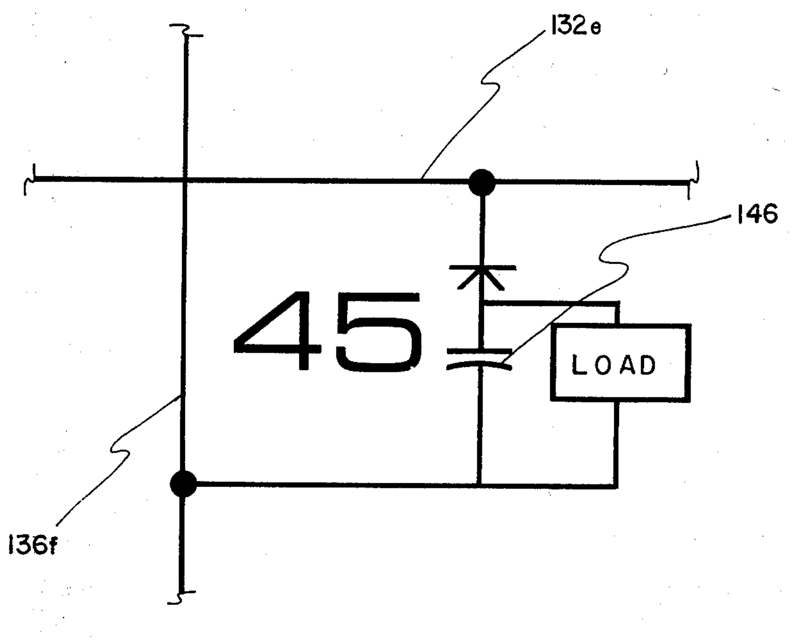
FIG. 5 is a fragmentary schematic view illustrating a single working unit of the receiver provided with a capacitor for continuous operation.

In the preferred embodiment illustrated in FIGS. 1–4 for the communication system of the present invention, it is appreicated that in the actuation of a particular working unit, current is only momentarily supplied thereto during the time corresponding to the duration of a single negative voltage pulse. However, continuous operation of the working unit can be achieved by various electrical circuitry designs in association with each respective unit. For example, in FIG. 5, there is illustrated a capacitor 146 in parallel with a working unit number 45. In actuating the working unit having the capacitor 146 associated therewith, it is seen that the closing of the respective corresponding switch in the switching complex 126 causes the capacitor to be momentarily charged each time the ring counter 118 cycles.

It should be emphasized that the communication system 100 of the present invention utilizes time divisional electric pulses and at least two different voltage levels to control the receiver 116. For the sake of simplicity, the preferred embodiment disclosed herein utilizes a reverse polarity switching system wherein the voltage levels referred to are a plus 10 voltage (voltage source 122) and a minus 10 volts (voltage source 120). However, it should be appreciated that the current flow control means 138 and 142 could be designed to respond to different voltage levels that are either plus or minus. Also, in this regard, it can be appreciated that the utility of the communication system of the present invention could be expanded by providing current flow control means that was responsive to a series or plurality of different voltage signals and in these cases, the particular working units of the receiver could perform more than one communication function.

For example and in this regard, the principal communication concepts disclosed herein could be used in a communication system within a hospital where the patient by actuating anyone of a plurality of switches could indicate and appraise personnel at the nurses' station of anyone of a number of particular requests. Also, in terms of utility, the communication system 100 of the present invention would be well suited for motels, hotels and the like as a communication system between respective rooms and a central management point within the motel.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A time division reverse polarity circuit switching system for remotedly controlling a plurality of load units from at least one main switching area, said time division reverse polarity circuit switching system comprising:

a. a plurality of main conductor lines operatively connected to a main switching system and leading therefrom to at least one remote area;

b. a plurality of load units operatively connected in said circuit switching system remotedly from said main switching system;

c. each load unit operatively connected in at least one normally open circuit within said circuit switching system, said normally open circuit being achieved by the provision of first and second current flow control means;

d. said first current flow control means including means for closing said normally open circuit in response to electric current of a first polarity while being nonresponsive to current of a second polarity, opposite said first polarity;

e. said second current flow control means including means for closing said normally open circuit in response to the electric current of a second polarity opposite said first polarity, while being nonresponsive to current of said first polarity;

f. a time division electric pulse generating means operatively connected to said plurality of main conductor lines for applying in a predetermined time sequence electric pulse signals of said first polarity to respective main conductor lines, whereby said electric pulse signals of said first polarity assume separate sequential time slots over a period of time relative to respective main conductor lines and consequently actuate said first current flow control means so as to close that portion of the normally open circuit being controlled thereby;

g. second electric source means of a second polarity, opposite said first polarity, operatively connected to said circuit switching system; and h. means operatively associated with said circuit switching system for selectively applying said second electric source to respective main conductor lines during selective time slot intervals such that during these selected time slot intervals said second current flow control means is actuated simultaneously with said first current flow control means and consequently, the normally open circuit is closed by said first and second current flow control means and the respective load units therein can be actuated by an electric current.

2. The time division reverse polarity circuit switching system of claim 1 wherein said switching system includes a matrix switching system wherein predetermined time voltage pulses are on two main conductor lines simultaneously.

3. The time division reverse polarity circuit switching system of claim 2 wherein said working units are connected in a matrix configuration including a series of normally open circuits that are operatively interconnected in matrix form wherein any particular working unit is operatively connected between said first and second current flow control means, and wherein each of said normally open circuits are operatively connected to at least one of said main conductor lines and said second electric source means whereby any respective working unit may be actuated by the simultaneous actuation of said first and second current flow control means because such actuation in effect closes said normally open circuits.

4. The time division reverse polarity circuit switching system of claim 3 wherein individual working units within said matrix configuration is identified by a number that is determined by a number assigned to any one of said respective main conductor lines and a time slot number that is representative of a voltage signal in a particular time interval.

5. A time division varying voltage level circuit switching system for remotedly controlling a plurality of load units from at least one main switching area, said time division varying voltage level circuit switching system comprising:

a. a plurality of main conductor lines operatively connected to a main switching system and leading therefrom to at least one remote area;

b. a plurality of load units operatively connected in said circuit switching system remotedly from said main switching system;

c. each load unit operatively connected in at least one normally open circuit within said circuit switching system, said normally open circuit being achieved by the provision of first and second current flow control means;

d. said first current flow control means including means for closing said normally open circuit in response to electric current of a first voltage level while being nonresponsive to at least a current of a second different voltage level;

e. said second current flow control means including means for closing said normally open circuit in response to the electric current of a second voltage level different from said first voltage level while being nonresponsive to current of said first voltage level;

f. a time division electric pulse generating means operatively connected to said plurality of main conductor lines for applying in a predetermined time sequence electric pulse signals of said first voltage level to respective main conductor lines, whereby said electric pulse signals of said first voltage level assume separate sequential time slots over a period of time relative to respective main conductor lines and consequently actuate said first current flow control means so as to close that portion of the normally open circuit being controlled thereby;

g. second electric source means of said second voltage level operatively connected to said circuit switching system; and h. means operatively associated with said circuit switching system for selectively applying said second electric source to respective main conductor lines during selective time slot intervals such that during these selected time slot intervals said second current flow control means is actuated simultaneously with said first current flow control means and consequently, the normally open circuit is closed by said first and second current flow control means and the respective load unit therein can be actuated by an electric current.

* * * * *